(12) United States Patent
Addis

(10) Patent No.: US 8,414,254 B2
(45) Date of Patent: Apr. 9, 2013

(54) SEALING ASSEMBLY FOR A TURBINE ENGINE

(75) Inventor: Mark E. Addis, Kennebunk, ME (US)

(73) Assignee: United Technologies Corporation, Hartford, CT (US)

( * ) Notice: Subject to any disclaimer, the term of this patent is extended or adjusted under 35 U.S.C. 154(b) by 1419 days.

(21) Appl. No.: 12/032,771

(22) Filed: Feb. 18, 2008

(65) Prior Publication Data

US 2009/0208330 A1    Aug. 20, 2009

(51) Int. Cl.
*F01D 11/08* (2006.01)

(52) U.S. Cl. .................................. 415/173.1; 415/173.3

(58) Field of Classification Search ............... 415/171.1, 415/173.1, 173.3, 173.6, 174.2
See application file for complete search history.

(56) References Cited

U.S. PATENT DOCUMENTS

| | | | | |
|---|---|---|---|---|
| 885,032 | A | * | 4/1908 | De Ferranti ................ 415/173.6 |
| 3,818,534 | A | * | 6/1974 | Boucherie ........................ 15/195 |
| 5,090,710 | A | * | 2/1992 | Flower ............................ 277/355 |
| 5,752,802 | A | | 5/1998 | Jones |
| 6,027,121 | A | * | 2/2000 | Cromer et al. ................ 277/347 |
| 6,131,910 | A | | 10/2000 | Bagepalli et al. |
| 6,139,019 | A | | 10/2000 | Dinc et al. |
| 6,170,831 | B1 | | 1/2001 | Bouchard |
| 6,206,629 | B1 | * | 3/2001 | Reluzco et al. ................... 415/1 |
| 6,217,277 | B1 | | 4/2001 | Liu et al. |
| 6,257,588 | B1 | * | 7/2001 | Bagepalli et al. ............. 277/355 |
| 6,471,213 | B1 | | 10/2002 | Yuri et al. |
| 6,488,471 | B1 | * | 12/2002 | Stibich et al. ............. 415/173.3 |
| 6,536,773 | B2 | | 3/2003 | Datta |
| 6,779,799 | B2 | | 8/2004 | Tong et al. |
| 6,799,765 | B2 | * | 10/2004 | Beichl ............................ 277/355 |
| 6,880,829 | B1 | | 4/2005 | Datta |
| 6,932,347 | B2 | | 8/2005 | Beichl et al. |
| 7,181,843 | B1 | | 2/2007 | Tabbita et al. |
| 7,270,333 | B2 | | 9/2007 | Addis |
| 2005/0179207 | A1 | * | 8/2005 | Datta ............................ 277/350 |

OTHER PUBLICATIONS

Extended European Search Report for Application No. EP 09 25 0302 dated Apr. 17, 2012.

* cited by examiner

*Primary Examiner* — Dwayne J White
(74) *Attorney, Agent, or Firm* — Carlson, Gaskey & Olds PC

(57) ABSTRACT

A sealing assembly for a turbine engine has a brush configured to provide an air seal between an outer air seal segment and a blade. A support is provided for the brush and is configured for attachment to the outer air seal segment. The support is a flexible planar carrier having a first side and a second side. The brush extends from the first side while the second side is for attachment to the outer air seal segment. The flexible planar carrier has a stiffness less than a stiffness of the outer air seal segment.

28 Claims, 3 Drawing Sheets

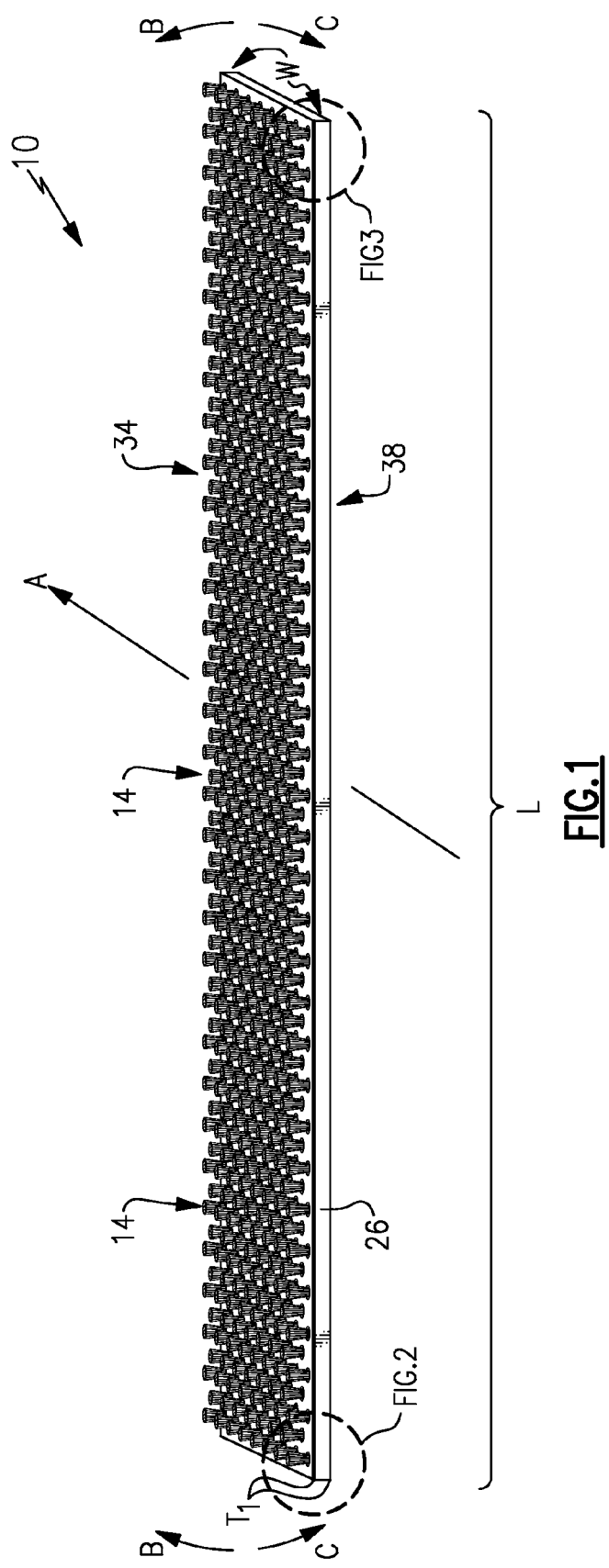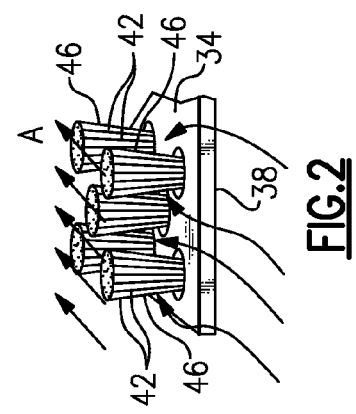

SEALING ASSEMBLY FOR A TURBINE ENGINE

BACKGROUND OF THE INVENTION

This invention relates to a brush shroud assembly for a gas turbine engine.

A gas turbine engine for an airplane has an outer air seal made of segments. These outer air seal segments form a circular cover or case around the rotating blades of a compressor or turbine. A gap is necessary between the case and blade to prevent the tips of the blades from contacting the case and being damaged. However, this gap reduces the efficiency of the turbine engine by permitting the creation of turbulence and air leakage at the tips of the blades. It is desirable to reduce the space between the outer air seal segment and the rotating blade so as to reduce this turbulence.

Airplane manufacturers have used plasma spray coatings, feltmetal or rubber between the outer air seal segment and the blade for this purpose. During a break-in period, the blades rub up against these abradable surfaces to provide sufficient clearance for rotation of the blades while providing a seal against turbulence and air leakage between the blade and the outer air seal segment. Typically, worn abradable surfaces are restored as part of an engine overhaul.

More recently, manufacturers have begun using bristle brushes formed as part of the outer air seal segment. Because bristle brushes are formed as part of the outer air seal segment, they are expensive and potentially difficult to replace. Furthermore, the outer air seal segments are specific to the particular design and size of the turbine engine. For example, one outer air seal segment having a brush may fit one particular diameter of turbine engine but not another because the outer air seal segment has a curvature conforming to the specific sized radius of the turbine engine. As a consequence, replacement of the brush requires replacement of the entire outer air seal segment or its repair. A need therefore exists for improved sealing assemblies.

SUMMARY OF THE INVENTION

A sealing assembly for a turbine engine has a brush configured to provide an air seal between an outer air seal segment and a blade. A support for the brush is provided. The support is configured for attachment to an outer air seal segment. The support comprises a flexible planar carrier having a first side and a second side. The brush extends from the first side while the second side is for attachment to the outer air seal segment. The flexible planar carrier has a stiffness less than a stiffness of the outer air seal segment.

The various features and advantages of this invention will become apparent to those skilled in the art from the following detailed description. The drawings that accompany the detailed description can be briefly described as follows.

BRIEF DESCRIPTION OF THE DRAWINGS

FIG. 1 illustrates a sealing assembly with brush and support.

FIG. 2 illustrates a close-up view of the brush and support of FIG. 1, showing bunches of bristles that compose the brush.

DETAILED DESCRIPTION OF THE PREFERRED EMBODIMENT

Figure 4:
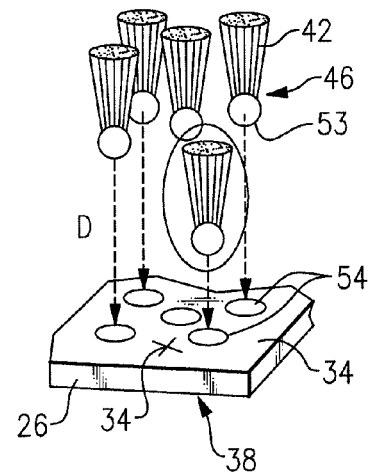
FIG. 4 illustrates another method of attachment of the bristles to the support of FIG. 1.

With reference to FIG. 1, there is shown sealing assembly 10. Sealing assembly 10 has brush 14 mounted to support 26. Support 26 has first side 34 from which brush 14 extends and second side 38 for attachment to an outer air seal segment (see FIGS. 4 and 5). Support 26 is a flexible planar carrier having thickness $T_1$ with width W and length L. Support 26 is made of a flexible material, such as a flexible metal, flexible carbon composite or an elastomer. The stiffness of support 26 is much less than an anticipated stiffness of the outer air seal segment upon which support 26 will be mounted. With reference to FIG. 1, support 26 may flex in the direction of arrows B or in the direction of arrows C along length L. Support 26 should be flexible enough so as to easily conform to a wide variety of curvatures of an outer air seal segment.

FIG. 2 illustrates a close up view of a section of sealing assembly 10. As shown, support 26 has bristles 42 that are formed in bunches 46. Each bunch 46 is separately attached to support 26 as will be explained. These plurality of bunches 46 form brush 14 and are oriented so as to inhibit movement of air in the direction of arrow A.

Figure 3:
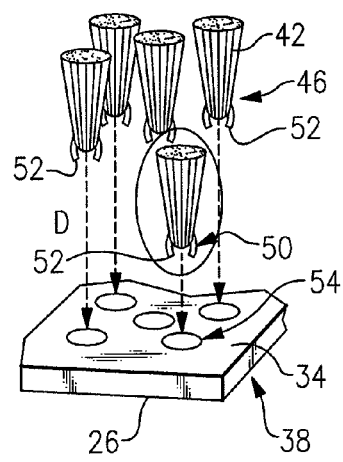
FIG. 3 illustrates the attachment of bristles to the support of FIG. 1.

FIG. 3 shows a close up of another section of sealing assembly 10. Each bunch 46 of bristles 42 is disposed over each hole 54, which is sized to receive each bunch 46. Bunches 46 are planted in holes 54 in the direction of arrow D. Each bunch 46 is attached to support 26 by its own connector 50, here staple 52. In this way, bristles 42 may be easily and inexpensively attached to support 26.

Alternatively, bunches 46 may be attached by weld ball 53 instead of by staple 52. Bunches 46 have weld balls 53 on each bunch 46 and are planted by depositing them in the direction of arrow D into holes 54. Weld balls 53 are then welded to each hole 54.

Figure 5:
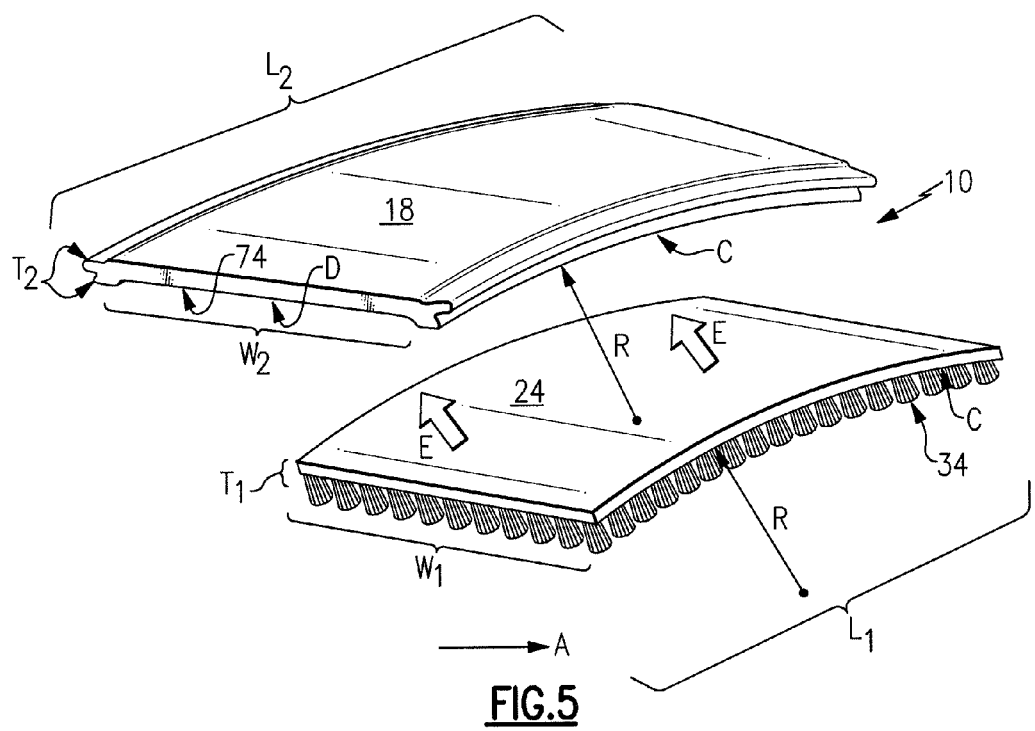
FIG. 5 illustrates the mounting of the support with brush onto outer air seal segment.
Figure 6:
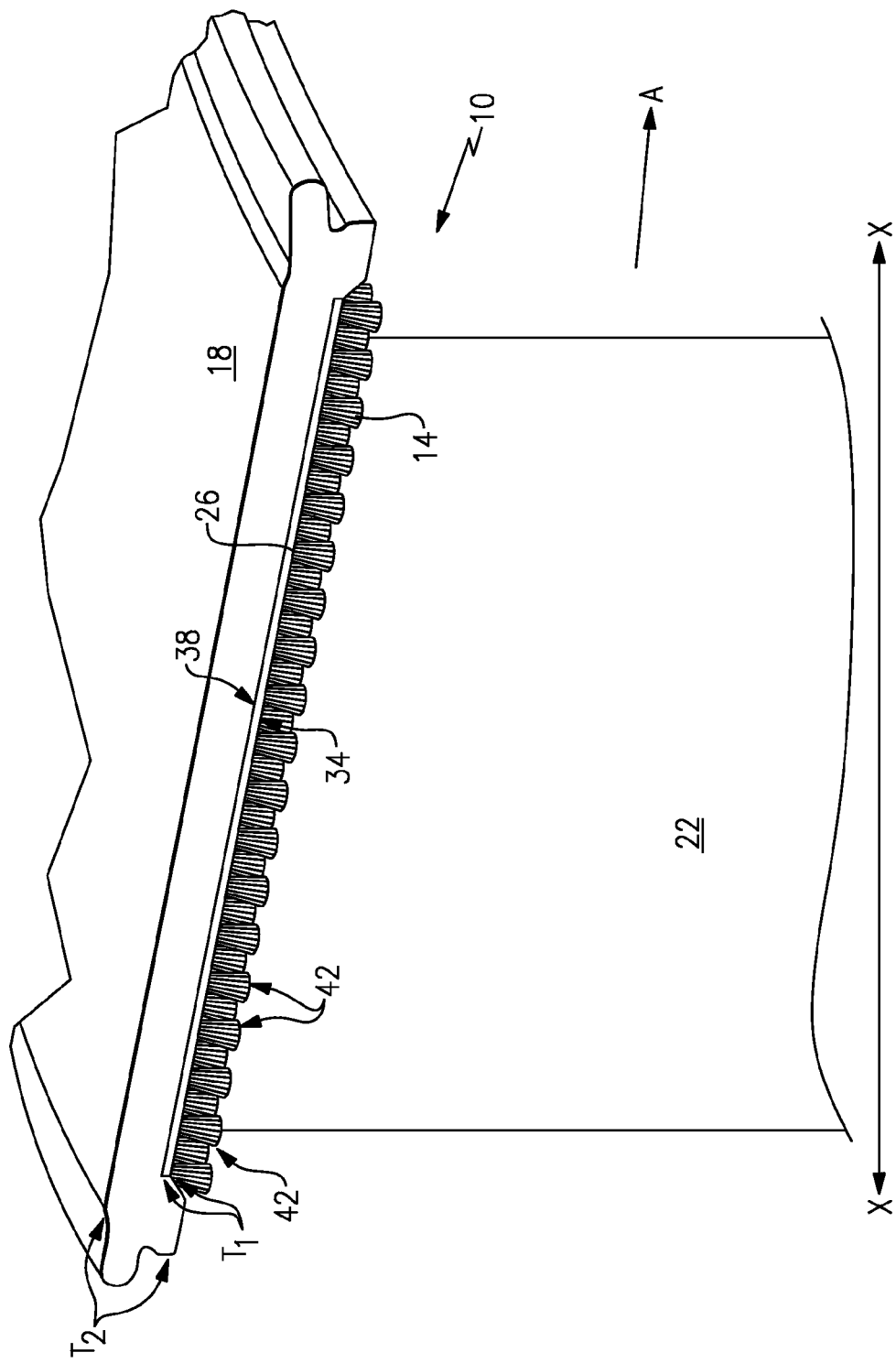
FIG. 6 illustrates brush and support mounted to outer air seal segment and disposed next to blade 22.

With reference to FIGS. 5 and 6, a method of attaching assembly 10 to outer air seal segment 18 is shown. As shown in FIG. 5, support 26 has thickness $T_1$, which may be less than the thickness $T_2$ of outer air seal segment 18. Outer air seal segment 18 has curvature C as defined by radius R. When all outer air seal segments 18 are joined to form case, they define the diameter of the outer air seal for the turbine engine. Due to the flexibility of support 26, it may be shaped to conform to the curvature C of outer air seal segment 18. In this way, support 26 may be used on a wide variety of outer air seals for a number of differently sized turbine engines having different diameters.

In addition, outer air seal segment 18 has recess 74 with width $W_2$ and depth D. Support 26 may be sized to be received within recess 74 of outer air seal segment 18. Accordingly, recess 74 has width $W_2$ while support 26 has width $W_1$, which is less than or equal to $W_2$. Also, support 26 is constructed so that its thickness, $T_1$, is less than depth D, so that support 26 will not add to the thickness of outer air seal segment 18.

In FIG. 5, support 26 is shown having a curve length $L_1$ about equal to a curved length $L_2$ of outer air seal segment 18. However, support 26 may be longer or shorter than length $L_2$ of outer air seal segment 18. Support 26 may be stored in long rolls so that a maintenance technician may cut support 26 to a length that exactly covers outer air seal segment 18 or may be cut to smaller pieces so that several supports 26 fit across length $L_2$ of outer air seal segment 18. Thus, support 26 gives the maintenance technician the flexibility to custom fit all or a portion of outer air seal segment 18. Support 26 can even be placed on outer air seal segment 18 without its removal from the engine case. Support 26 is simply disposed over outer air seal segment 18 and moved in the direction of arrow E for mounting on air seal segment 18 by an adhesive, by welding, by brazing or even by stapling to outer air seal segment 18.

FIG. 6 illustrates sealing assembly 10 in relationship to blade 22, which may be either a compressor blade or a turbine blade. Blade 22 rotates about axis X and moves air in the direction of arrow A generally along axis X. As shown, blade 22 is disposed in brush 14 without any gap between bristles 42 and turbine blade 22.

The foregoing description shall be interpreted as illustrative and not in any limiting sense. A worker of ordinary skill in the art would recognize that certain modifications would come within the scope of this invention. For that reason, the follow claims should be studied to determine the true scope and content of this invention.

I claim:

1. A sealing assembly for a turbine engine, comprising:
   a brush configured to provide an air seal between an outer air seal segment and a blade;
   a support for said brush, said support configured for attachment to the outer air seal segment; and
   wherein said support comprises a flexible planar carrier having a first side and a second side, said brush extending from said first side, said second side for attachment to the outer air seal segment, and said flexible planar carrier having a stiffness less than a stiffness of the outer air seal segment.

2. The sealing assembly of claim 1 wherein said brush comprises bristles.

3. The sealing assembly of claim 2 including a plurality of holes in said support for receiving said bristles.

4. The sealing assembly of claim 2 wherein said bristles are formed into a bunch by a connector.

5. The sealing assembly of claim 4 wherein said connector is attached to said support.

6. The sealing assembly of claim 4 wherein said connector comprises a staple.

7. The sealing assembly of claim 4 wherein said connector comprises a weld bead.

8. The sealing assembly of claim 1 wherein said support is made of a flexible metal.

9. The sealing assembly of claim 1 wherein said support is made of a flexible carbon composite material.

10. The sealing assembly of claim 1 wherein said support is made of an elastomer material.

11. The sealing assembly of claim 1 wherein said planar carrier has a thickness, a width and a length, said thickness defined by said first side and said second side.

12. The sealing assembly of claim 11 wherein said thickness is less than an anticipated thickness of an outer air seal segment.

13. The sealing assembly of claim 11, wherein said width is sized to be received within the outer air seal segment.

14. The sealing assembly of claim 1 wherein said support supports a plurality of other brushes, at least some of said other brushes arranged downstream, relative to an expected airflow, of said brush.

15. The sealing assembly of claim 1 wherein said planar carrier has a carrier thickness, a width and a length.

16. The sealing assembly of claim 15 wherein said length of said planar carrier is at least as long as a length of the outer air seal segment.

17. The sealing assembly of claim 16 wherein the outer air seal segment is provided with only one support.

18. The sealing assembly of claim 15 wherein said length of said planar carrier is shorter than a length of the outer air seal segment.

19. The sealing assembly of claim 18 wherein the outer air seal segment is provided with more than one support.

20. The sealing assembly of claim 1 including a plurality of brushes, wherein said flexible planar carrier supports said plurality of brushes such that said brushes are spaced axially, relative to an axis of rotation of the blade, from one another.

21. The sealing assembly of claim 20 wherein said sealing assembly includes only one flexible planar carrier, said flexible planar carrier supporting each of said plurality of brushes.

22. A sealing assembly for a turbine engine, comprising:
   an outer air seal segment;
   a brush comprising bristles, said brush configured to provide an air seal between said outer air seal segment and a blade;
   a support attached to said brush and attached to said outer air seal segment; and
   wherein said support comprises a flexible planar carrier having a first side and a second side, said brush extending from said first side, said second side for attachment to the outer air seal segment, and said flexible planar carrier having a stiffness less than a stiffness of said outer air seal segment.

23. The sealing assembly of claim 22 wherein said support is made of one of a flexible metal, a flexible carbon composite material, and an elastomer material.

24. The sealing assembly of claim 22 wherein said planar carrier has a carrier thickness, a width and a length, said carrier thickness defined by said first side and said second side, said carrier thickness less than an outer air seal segment thickness of said outer air seal segment.

25. The sealing assembly of claim 24 wherein said width is sized to be received within said outer air seal segment.

26. The sealing assembly of claim 22 wherein said outer air seal segment has a recess having a depth, said depth at least as great as said carrier thickness.

27. A method of sealing an outer air seal for a turbine engine, comprising the steps of:
   providing a brush configured to provide an air seal between an outer air seal segment and a blade, the outer air seal segment having a curvature;
   providing a support attached to the brush, the support comprises a flexible planar carrier having a first side and a second side, the brush extending from the first side, the second side for attachment to the outer air seal segment;
   flexing the support to conform to the curvature of the outer air seal segment; and
   mounting the support to the outer air seal segment.

28. The method of claim 27 including the step of reducing a length of the support to a size at least as large a length of the outer air seal segment.

* * * * *